No. 11,954. Reissued Dec. 3, 1901.

O. W. HUNSAKER.

CASH REGISTER.

(Application filed Dec. 17, 1900.)

3 Sheets—Sheet 1.

Witnesses

W. A. Alexander

Jesse R. Watkins

Inventor

O. W. Hunsaker

By Attorneys Fowler & Bryson

No. 11,954. Reissued Dec. 3, 1901.

O. W. HUNSAKER.

CASH REGISTER.

(Application filed Dec. 17, 1900.)

3 Sheets—Sheet 2.

Witnesses

W. A. Alexander

Jessie R. Hartkine

Inventor

O. W. Hunsaker

By Attorneys Fowler & Bryson.

No. 11,954. Reissued Dec. 3, 1901.

O. W. HUNSAKER.

CASH REGISTER.

(Application filed Dec. 17, 1900.)

3 Sheets—Sheet 3.

Witnesses

W. A. Alexander

Jessie R. Hatkins

Inventor

O. W. Hunsaker

By Attorneys Fowler & Bryson

UNITED STATES PATENT OFFICE.

OSCAR W. HUNSAKER, OF ST. LOUIS, MISSOURI.

CASH-REGISTER.

SPECIFICATION forming part of Reissued Letters Patent No. 11,954, dated December 3, 1901.

Original No. 638,929, dated December 12, 1899. Application for reissue filed December 17, 1900. Serial No. 40,218.

*To all whom it may concern:*

Be it known that I, OSCAR W. HUNSAKER, a citizen of the United States, residing at the city of St. Louis, in the State of Missouri, have invented a certain new and useful Cash-Register, of which the following is such a full, clear, and exact description as will enable any one skilled in the art to which it appertains to make and use the same, reference being had to the accompanying drawings, forming part of this specification.

My invention relates to improvements in cash-registers; and it consists in the novel combination and arrangement of parts, as will be hereinafter more particularly described and claimed.

Figure 1:
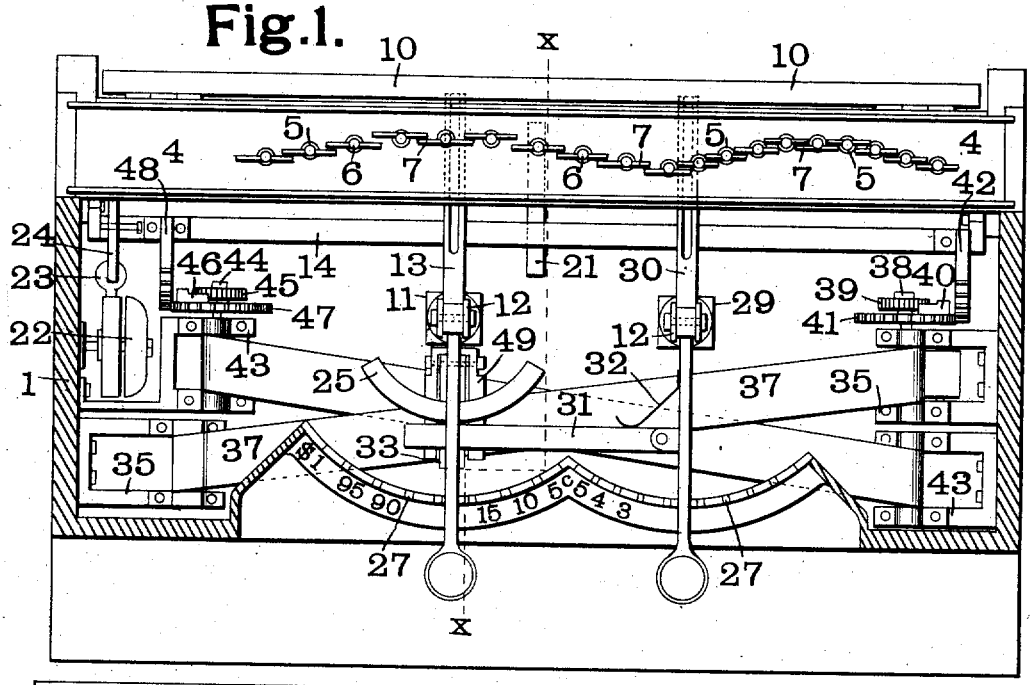
Figure 2:
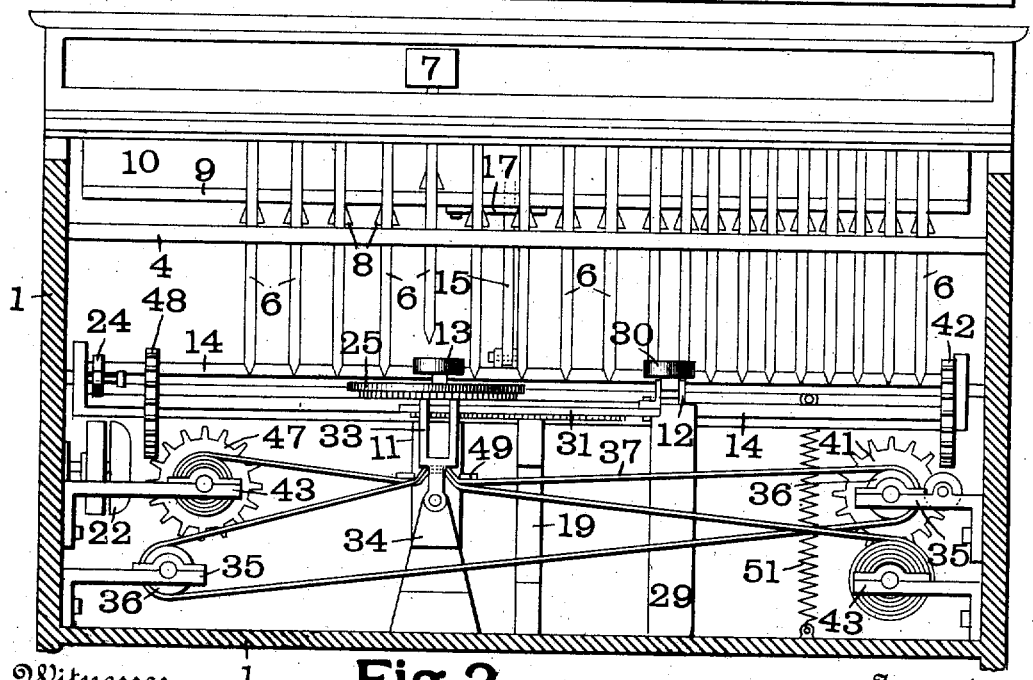
Figure 4:
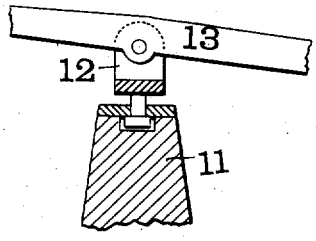
Figure 3:
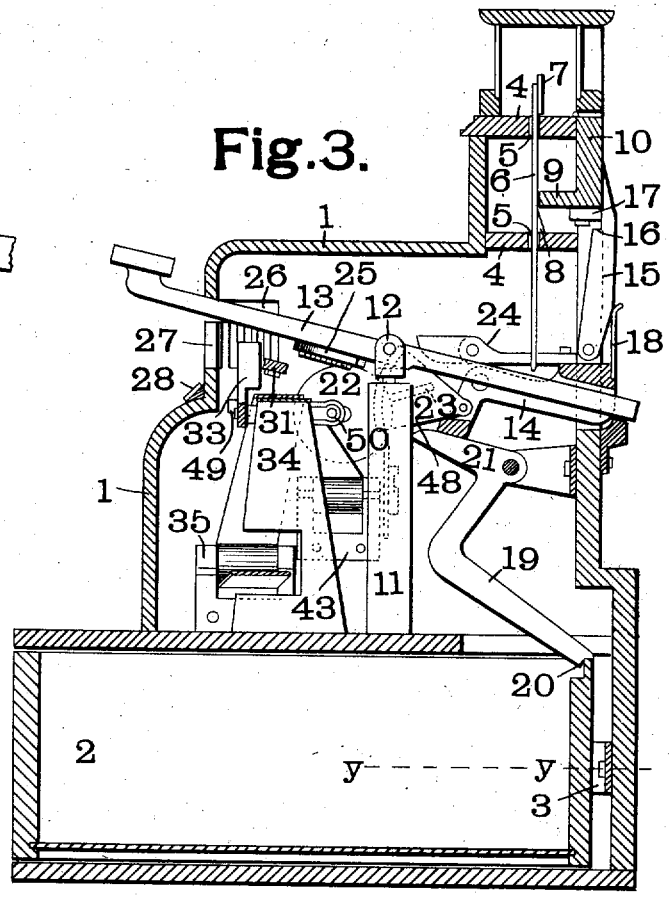
Figure 5:
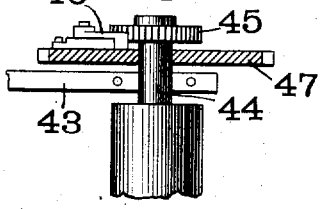
Figure 6:
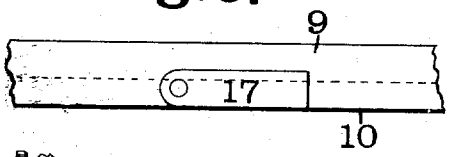
Figure 11:
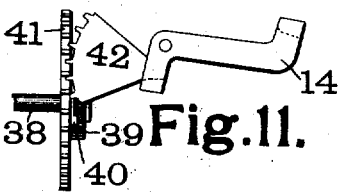
Figure 7:
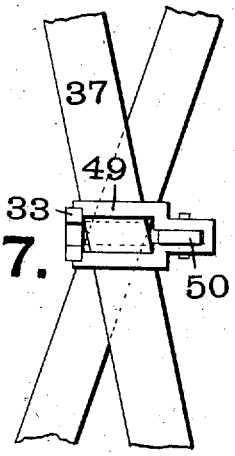
Figure 8:
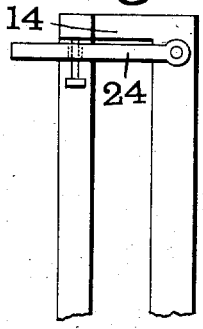
Figure 9:
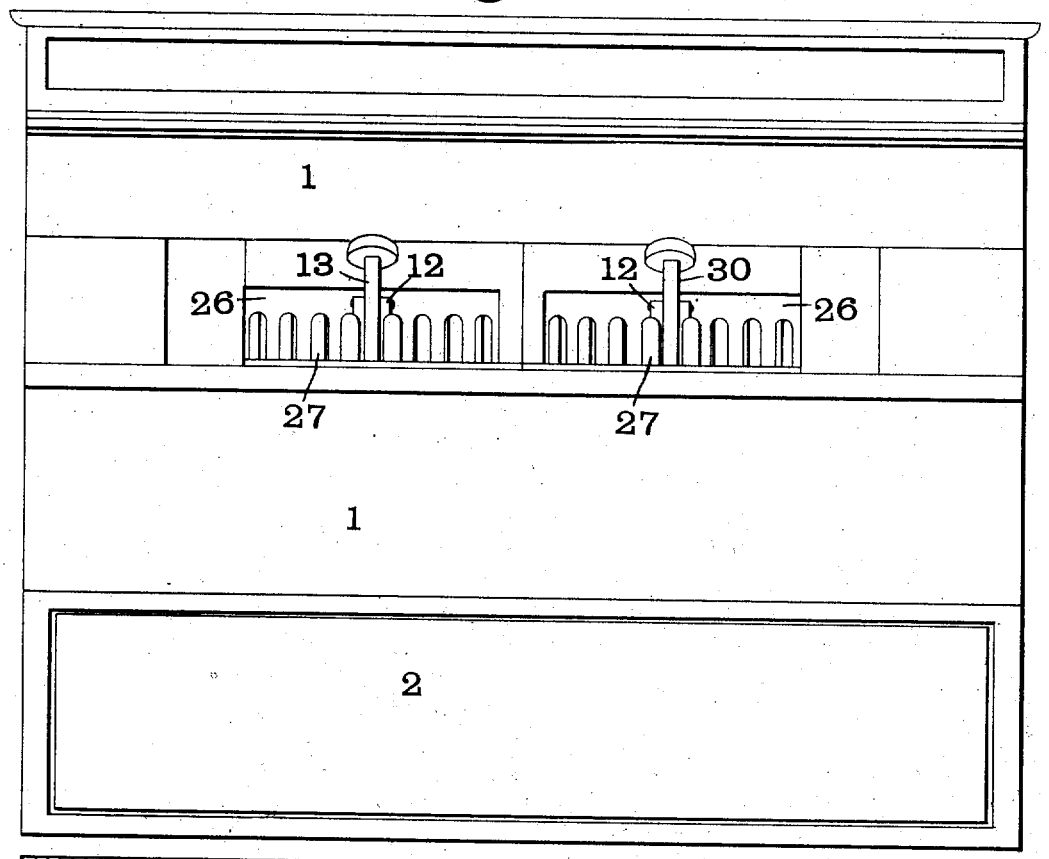
Figure 10:
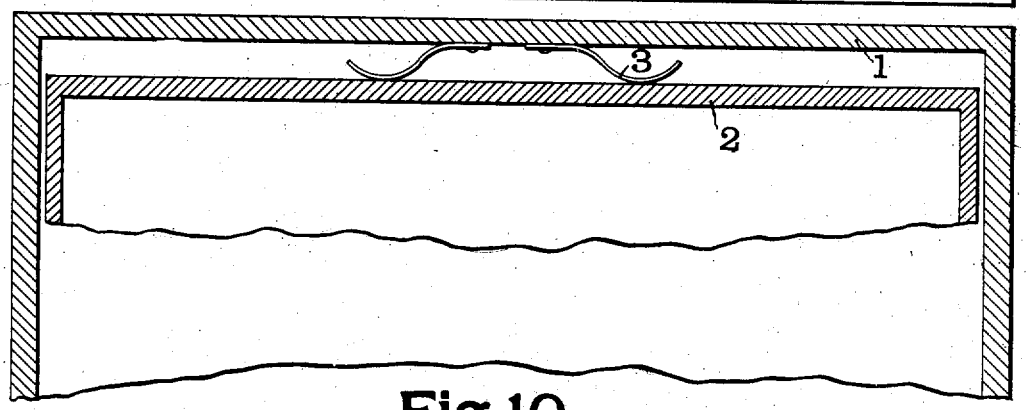

In the drawings, Figure 1 is a top plan view of my complete invention with the casing broken away, showing more clearly the construction and arrangement of the parts located within the cash-register. Fig. 2 is a front view of the same, also with casing partially broken away. Fig. 3 is a vertical transverse section of my complete invention, taken on the line *x x* of Fig. 1. Fig. 4 is a detail sectional view of one of the operating-levers, showing the manner in which it is movably secured to its pedestal. Fig. 5 is a combined section and top plan view of the roller, gear, and ratchet which carries the paper upon which the amounts of the purchase are printed. Fig. 6 is a detail bottom plan view of the medial portion of the device which holds up the rods which carry the tab for indicating the amount of the purchase. Fig. 7 is a top plan view of that portion of the machine where the inking-ribbon and paper cross. Fig. 8 is a top plan view of one end of the rock-frame with which the operating-levers coöperate. Fig. 9 is a front elevation of the complete machine. Fig. 10 is a horizontal section taken on the line *y y* of Fig. 3, showing the spring for opening the drawer when the latter is automatically released by the depression of one of the operating-levers; and Fig. 11 is a detail side elevation of the rocking frame and a portion of one of the gears of the printing device, showing the manner in which the same coöperate.

The object of my invention is to construct a simple, practical, and durable cash-register, the parts comprising the same being of such a nature that it is impossible for the same to get out of order under the ordinary usage to which the register is subjected, the latter being designed especially for all purposes where a cash-register is desired; and it consists particularly of a suitable casing of any design or ornamentation, rods movably located within the same, the upper ends of which are provided with tabs upon which are printed the various amounts, as is common in all cash-registers, the lower ends of said rods projecting downwardly and in a position to be readily struck by its appropriate operating-lever, the latter being pivoted to a suitable pedestal located within the machine and susceptible not only to a lateral but to a rocking movement, whereby the inner free ends of said lever may be moved under any one of the lower free ends of the rods, whereby the tab which will indicate the amount of the purchase will only be elevated, a rocking frame pivoted to the opposite sides of the frame of the machine with which the inner free ends of the operating-levers coöperate, an L-shaped frame hinged to the rear of the machine, the lower edge of which is adapted to coöperate with suitable lugs forming a part of the rods, whereby the latter or any one of them will be held in an elevated position until another rod is operated or pushed upwardly, means carried by said rocking frame and coöperating with the L-shaped frame for releasing the rods, a lever pivoted to the back of the machine or casing thereof, the lower end of which is adapted to coöperate with the drawer for holding the same in a closed position, the upper end of said lever being actuated or struck by the rocking frame when either one of the operating-levers is depressed, suitable means for feeding an endless ribbon and paper, which cross one another, whereby when either one of the operating-levers is depressed the type carried by the same will come in contact with the ribbon and cause the proper amount or figure to be printed upon the paper located below said ribbon, means for feeding the ribbon and paper simultaneously when the rocking lever is actuated by the depression of either one of the operating-levers, a suitable alarm or bell, an arm pivoted to the rocking frame the free end of which is adapted to coöperate with said bell upon the depression of either one or both of said levers, and in other details hereinafter to be described.

Referring to the drawings, 1 represents a casing the lower portion of which is provided with a drawer 2, and secured to the rear of said casing is a spring 3, the free ends of which coöperate with the rear wall of the said drawer for operating the latter in an outward direction when the same is released. Located within the casing are two longitudinal walls 4, which are provided with openings 5, which loosely receive rods 6, the upper ends of which are provided with the usual tabs 7, upon which are printed the various numbers or amounts commonly employed to indicate the amount of the purchase, the lower free ends of said rods projecting a suitable distance downwardly, and forming a part of said rods are lugs 8, which are adapted to coöperate with the horizontal extension 9 of the hinged L-shaped frame 10, it being observed that when any one of the rods 6 is elevated the lugs 8, forming a part of the same, will come in contact with the horizontal extension of the L-shaped frame 10 and slightly move the same until the lug has passed above the upper surface of the extension 9 thereof, after which the said frame will move back again to its normal position, and the lug 8 will rest upon the upper surface of the said extension until released by the movement of the frame 10 by the mechanism hereinafter described.

Located within the casing 1 of the machine is a pedestal 11, to the upper end of which is pivotally secured a fork 12, and hinged to the said fork is an operating-lever 13, the outer end of which is provided with any suitable operating handle, knob, or button, the inner end of said lever being located below the lower free ends of the rods 6. The rocking frame 14 runs the full length of the machine and is pivotally secured to the opposite sides of the casing 1 of the same with which the inner free end of the operating-lever 13 coöperates, as best shown in Fig. 3 of the drawings, whereby when the said operating-lever is depressed the rocking frame 14 is actuated or its rear portion thereof elevated. Hinged to the rocking frame 14 is an arm 15, having a shoulder 16, which coöperates with a block 17, pivotally secured to the under surface of the horizontal extension 9 of the L-shaped frame 10, and carried by the rocking frame 14 is a spring 18, the free end of which bears against the rear surface of the hinged arm 15 for holding the latter in an operative position in respect to the L-shaped frame, whereby when the rear portion of said rocking frame is elevated by the depression of the operating-lever 13 the L-shaped frame 10 will be forced outwardly to cause the horizontal extension 9 thereof to move out of contact with the rods 6, thereby releasing any one of them or the one that has been previously elevated and held.

Pivoted to the back of the machine is a lever 19, the lower arm of which is provided with a shoulder 20, which is adapted to coöperate with the rear wall of the drawer 2, the upper arm 21 being located adjacent to the rocking frame 14, whereby when the latter is operated the lower arm of the lever 19 is elevated for releasing the drawer. Secured to one side of the casing is a bell 22, having an arm 23, which is adapted to be struck by the free end of the projecting lever 24, the latter being pivoted to the rocking frame 14, whereby the same or free end thereof may be turned out of engagement with the lever 23 of the bell when an alarm is not desired during the operation of the register. Secured to the under surface of the operating-lever 13 is a segmental plate 25, the lower surface of which is provided with numbers which are radially arranged, which numbers correspond to the numbers carried or printed upon the tabs 7 of the rods 6, and formed in the casing 1 is a slot 26 for the lateral movement of the outer end of the lever 13, and forming the lower portion of said slot are teeth 27, forming spaces which are adapted to receive the said lever when the same is depressed, corresponding numbers 28 being located on the outside of the casing which correspond to those of the segmental plate 25 and tabs 7.

Located adjacent to the pedestal 11 is a second pedestal 29, to which is likewise pivoted and hinged an operating-lever 30, the inner end of which coöperates with a suitable number of the rods 6 and also with the rocking frame 14 in a like manner to the lever 13, previously described, and hinged to one side of said lever 30 is a bar 31, the under surface of which is provided with suitable figures, which represent the amount of the purchase and correspond to the numbers on the tabs carried by the rods with which the said lever coöperates. Secured to the lever 30 is one end of a flat spring 32, the free end of which bears against the inner edge of the type-bar 31, causing the latter to bear against or coöperate with the fork 33, carried by the bed 34, whereby the said type-bar is always held in its proper position for printing when the lever 30 is depressed, notwithstanding the various positions of the latter.

Secured to the opposite sides of the casing are two brackets 35, which are provided with rollers 36, over which an endless ribbon 37 passes, said ribbon being provided with the usual ink, and secured to the shaft 38 of one of the rollers 36 is a ratchet 39, with which a pawl 40 coöperates, the latter being carried by a gear-wheel 41, loosely mounted upon the shaft 38, and secured to the rocking frame 14 and projecting therefrom is a toothed segmental gear 42, which is normally out of engagement and meshes with the said gear-wheel 41 when the said rocking frame is depressed for intermittingly turning the roller 36 as the machine is operated, thereby feeding the ribbon in a like manner. Also secured to the opposite sides of the casing of the machine are two brackets 43, which are provided with rollers, one of which carries the paper which has not been printed and the other receives the paper after the amounts have been printed thereon, and secured to the shaft 44 of one of the rollers is a ratchet 45, with which a hooked pawl 46 coöperates, the latter being carried by gear-wheel 47, loosely mounted on said shaft, and intermittingly coöperating with said gear-wheel is a segmental gear 48, which is secured to the rocking frame 14, whereby the paper is simultaneously fed with the ribbon at each depression of either one or both of said levers 13 and 30. In order to hold the ribbon and paper in their proper positions where they cross one another, and, further, in order that the proper impression will be made upon the paper when either the type carried by the segmental plate 25 or the type carried by the bar 31 is brought in contact with the ribbon, a fork 49 is pivoted to an extension 50 of the bed 34, whereby the ribbon and paper are held in position, as shown in Fig. 2 of the drawings.

The rocking frame 14 is held in its normal position by a spring 51, one end of which is secured to the casing of the machine and having its opposite end attached to said frame, as best shown in Fig. 2.

The casing 1 or front portion thereof is also slotted and provided with teeth, forming spaces for the reception of the lever 30 when the same is depressed and is operated in a like manner to the lever 13, the last-named lever registering and printing, preferably, the amounts of the purchase below and including one dollar, and the lever 30 registering and printing amounts that are higher in denomination.

Having fully described my invention, what I claim as new, and desire to secure by Letters Patent of the United States, is—

1. In a cash-register, the combination with a plurality of indicators, of a lever pivoted to move in two directions, a bed adjacent to which said lever moves, a set of printing characters carried by one of said parts, and a platen carried by the other of said parts, said lever being movable on its pivot in one direction while said printing characters and platen are out of contact to determine the indicator to be actuated, and in the other direction to display said indicator and bring said characters and platen into contact.

2. In a cash-register, the combination with a plurality of indicators, of a lever pivoted to move in two directions, a bed adjacent to which said lever moves, a set of printing characters carried by said lever, and a platen carried by said bed, said lever being movable on its pivot in one direction while said printing characters are out of contact with said platen to determine the indicator to be actuated, and in the other direction to display said indicator and bring said characters into contact with said platen.

3. In a cash-register, the combination with a plurality of indicators, of a lever pivoted to move in one path to determine the indicator to be actuated, a second path extending laterally from said first-named path and in which said lever moves from and returns to said first-named path at the point at which it leaves the same, and means for operating and displaying an indicator by the movement of said lever in said second path.

4. In a cash-register, the combination with a plurality of indicators, of a lever pivoted to move in one path to determine the indicator to be actuated, a second path extending laterally from said first-named path and in which said lever moves from and returns to said first-named path at the point at which it leaves the same, and a plurality of longitudinally-movable members carrying said indicators and adapted to be actuated by the movement of said lever in said second path.

5. A cash-register, comprising a series of rods or indicators, a support, a fork pivotally secured to the latter, an operating-lever hinged to said fork, and coöperating with the said rods when the same is depressed for elevating any one of said rods, a suitable printing device, and suitable mechanism coöperating with the lever and said printing device, as and for the purpose described.

6. A cash-register, comprising an operating-lever, type carried by the same, a suitable printing device located below said type, with which the latter is adapted to coöperate, a series of rods, the lower ends of which are adapted to be struck when the said lever is depressed, and a rocking frame actuated by the said lever, a pivoted arm carried by said frame, a hinged frame, coöperating with said rods, for holding the latter in an elevated position, the said arm coöperating with said hinged frame, for releasing the rods, and suitable means coöperating with the drawer, and rocking frame, as and for the purpose described.

7. A cash-register, comprising a series of rods or indicators, a support, a fork pivotally secured to the latter, an operating-lever hinged to said fork, and adapted to coöperate with the free ends of said rods when the same is depressed for elevating any one of said rods, a rocking frame actuated by said lever, a suitable printing device, and suitable gearing interposed between said rocking frame and printing device, as and for the purpose described.

8. A cash-register, comprising a suitable casing, a series of rods or indicators located within the same, a support, a fork pivotally secured to the latter, an operating-lever hinged to said fork, and adapted to coöperate with the free ends of said rods when the same is depressed for elevating any one of the rods, a rocking frame actuated by said lever said casing having a slot formed therein for the lateral movement of said lever, teeth forming the lower portions of said slot, providing spaces for receiving the lever when the same is depressed, a suitable printing device, and mechanism coöperating with the lever, and said printing device, as and for the purpose described.

9. In a cash-register, a printing device consisting of suitable rollers, an endless ribbon passing over the same, a suitable rocking frame, suitable mechanism coöperating with the latter, and one of said rollers for feeding the ribbon, a second set of rollers, paper carried by the same crossing and located below said ribbon, and suitable mechanism coöperating with the rocking frame, and one of the last-named rollers, whereby the ribbon and paper are fed simultaneously, as and for the purpose described.

10. A cash-register, comprising two pivoted and hinged levers, one of which is provided with a segmental plate, type forming a part, or secured to the under surface of the same, a type-bar, hinged to the other lever, a spring secured to said last-named lever, and coöperating with said bar, a suitable printing device located below said lever, and a fork carried by said printing device, with which the type-bar coöperates, whereby the latter is held in its proper position in respect to the printing device, during the movement of its lever, as and for the purpose described.

11. A cash-register, comprising two pivoted and hinged levers, type carried by the same, a suitable printing device located below the levers, a rocking frame, with which the inner ends of said levers coöperate, a series of rods loosely mounted along the length of the machine, and provided with lugs, an L-shaped hinged frame, adapted to coöperate with the lugs of said rods, for holding the latter in an elevated position, means for coöperating with the rocking frame, an L-shaped frame for releasing said rods, upon depression of either one or both of said operating-levers, and means coöperating with said rocking frame and drawer for releasing the latter when the levers are depressed, as and for the purpose described.

12. In a cash-register, a suitable rocking frame, a lever pivoted to the latter, and projecting a suitable distance, a bell secured to the casing of the register, and having an arm against which the projecting end of the lever is adapted to coöperate, whereby said lever may be turned out of engagement with the arm when it is not desired to ring the bell during the operating of the rocking frame, and a combined pivoted and hinged lever secured to an immovable support, for actuating said rocking frame, as and for the purpose described.

In testimony whereof I have hereunto set my hand and affixed my seal in the presence of the two subscribing witnesses.

OSCAR W. HUNSAKER. [L. S.]

Witnesses:
JAMES H. BRYSON,
JESSIE R. WATKINS.